(12) United States Patent
Lyke

(10) Patent No.: US 7,560,719 B2
(45) Date of Patent: Jul. 14, 2009

(54) COMMUTATOR MEASURING DEVICE

(76) Inventor: Shawn D. Lyke, 7116 Stone Mill Dr., Knoxville, TN (US) 37919

( * ) Notice: Subject to any disclaimer, the term of this patent is extended or adjusted under 35 U.S.C. 154(b) by 341 days.

(21) Appl. No.: 11/679,477

(22) Filed: Feb. 27, 2007

(65) Prior Publication Data
US 2008/0204767 A1 Aug. 28, 2008

(51) Int. Cl.
*G01M 19/00* (2006.01)
*H02K 11/00* (2006.01)
(52) U.S. Cl. .............. 250/559.29; 250/559.4; 250/231.14; 310/233
(58) Field of Classification Search ........... 250/559.29, 250/559.3, 559.38, 559.4, 559.42, 231.13, 250/231.14, 231.18; 310/233
See application file for complete search history.

(56) References Cited

U.S. PATENT DOCUMENTS

| | | | | |
|---|---|---|---|---|
| 4,644,157 | A | * | 2/1987 | Ozawa et al. .......... 250/231.16 |
| 4,947,071 | A | * | 8/1990 | Clarke ..................... 310/177 |
| 5,198,738 | A | * | 3/1993 | Blaser et al. ............. 318/652 |
| 5,301,545 | A | | 4/1994 | Meyer et al. |
| 5,442,953 | A | | 8/1995 | Fischer et al. |
| 6,710,480 | B1 | | 3/2004 | Baumeister et al. |
| 2008/0204767 | A1 | * | 8/2008 | Lyke ......................... 356/636 |

FOREIGN PATENT DOCUMENTS

| | | |
|---|---|---|
| JP | 3-170811 A | 7/1991 |
| JP | 2002/188908 | 7/2002 |
| JP | 2006/071533 | 3/2006 |
| RU | 2084822 C1 | 7/1997 |

* cited by examiner

*Primary Examiner*—John R Lee
(74) *Attorney, Agent, or Firm*—Luedeka, Neely & Graham, P.C.

(57) ABSTRACT

The present disclosure provides an apparatus and method for the measurement of the width and radial spacing of commutator segments with respect to span. The apparatus utilizes a microprocessor and computer to record and calculate data from both a rotary encoder wheel held in contact with the commutator surface as it turns, and a fiber optic sensor that recognizes commutator segment boundaries. The commutator is rotated for one revolution plus one span to improve convenience and accuracy of the measurements. Output is provided in the form of graphs and charts that show the variation in the different spans around the commutator, and information is also provided as to each bar and insulator.

17 Claims, 9 Drawing Sheets

COMMUTATOR MEASURING DEVICE

TECHNICAL FIELD

The present disclosure relates a method and apparatus for measuring the width and radial spacing of electric motor commutator segments with respect to span.

BACKGROUND AND SUMMARY

An electric motor commutator is a rotary switch that allows the electric current flowing through an electromagnet in a portion of a DC electric motor to be switched during rotation. This switching produces forces between the rotating portion of the motor and a stationary portion of the electric motor and causes rotation of the motor.

Generally, a commutator is constructed of a ring of wedge-shaped copper bars interspersed with thin insulating sheets of mica. For optimum operation of the motor, it is important that the radial spacing of these segments be consistent all the way around the commutator. This spacing is particularly important in how it relates to the span of the motor.

An exemplary embodiment provides a commutator measurement device with an inspection head for measuring distances along the commutator surface and it may have a rotary encoder adjacent to and in contact with the commutator. The encoder turns as the commutator is turned, and a sensor, such as a fiber optic sensor, is fixedly positioned adjacent to and at a constant distance from the commutator surface. The signals from both the rotary encoder and the fiber optic sensor are transmitted via data transmission cables to a processing system which may include a microprocessor unit electrically interfaced with a computer. The signals are processed by the microprocessor unit and transmitted to the computer for data viewing and further analysis.

In accordance with more specific aspects of the present disclosure, the fiber optic sensor comprises an emitter, a receiver, and a signal amplifier that produces a high or a low output. The signals from both the rotary encoder and the fiber optic sensor are maintained in temporal correlation by a microprocessor unit as the commutator is turned beneath the inspection head.

The rotary encoder measures the distance traveled around the circumference of the commutator by the emission of a predetermined number of electrical pulses per revolution of the encoder wheel, while the fiber optic sensor marks the transitions between the copper bars and the mica sheets with a change between a high signal and a low signal. Data from both the rotary encoder and the fiber optic sensor are maintained in temporal correlation by a programmable microprocessor unit so that each segment transition is marked by a unique number of pulse counts from the rotary encoder. The correlated data is processed and sent to a computer software program for viewing and further analysis.

DESCRIPTION OF THE EXEMPLARY EMBODIMENTS

The commutator of a DC motor typically consists of a set of copper bars, fixed around the circumference of a rotor. A set of spring-loaded carbon brushes is in contact with the commutator surface and is fixed to the stator so that the brushes complete the electrical circuit from the rotor's windings to the outside of the machine. Each bar of the commutator is insulated from the adjacent bars by thin sheets of an insulating material, such as mica. A large motor may contain hundreds of such commutator bars. For the purposes of this disclosure, the term "bar" refers to a single copper commutator bar, while the term "segment" refers to a bar together with an adjacent insulating sheet.

The present disclosure relates a method and apparatus for measuring variation in the radial spacing of commutator segments as it relates to the motor's theoretical span. For the purposes of this disclosure, the theoretical "span" of a motor represents the distance along the commutator surface from where the leading edge of a given brush contacts the commutator surface to where the leading edge of its corresponding brush (established via the motor windings) contacts the commutator surface. The theoretical span can be expressed in terms of an actual arc-length distance or as the number of segments that comprise that distance. The span expressed as an arc-length is calculated by:

(commutator diameter×pi)/(# of stator poles/2).

The span expressed in segments is calculated by:

(# of total commutator segments)/(# of stator poles/2).

For example, in a four pole motor having a commutator that is 10" in diameter and comprised of 120 total segments, the theoretical span could be expressed as 15.708" of arc-length or as 60 segments.

The actual radial spacing of this commutator would thus be determined by measuring the distance from the leading edge of the $1^{st}$ bar to the leading edge of the $61^{st}$ bar, then the distance from the leading edge of the $2^{nd}$ bar to the leading edge of the $62^{nd}$ bar, and so on until 120 measurements have been taken. Each of these measurements would then be compared to the theoretical distance of 15.708" to determine the amount of variation in the radial spacing of the commutator segments. The amount of this variation affects the performance of the electric motor. Optimal motor performance may be achieved when the commutator has minimal span variation.

Figure 1:
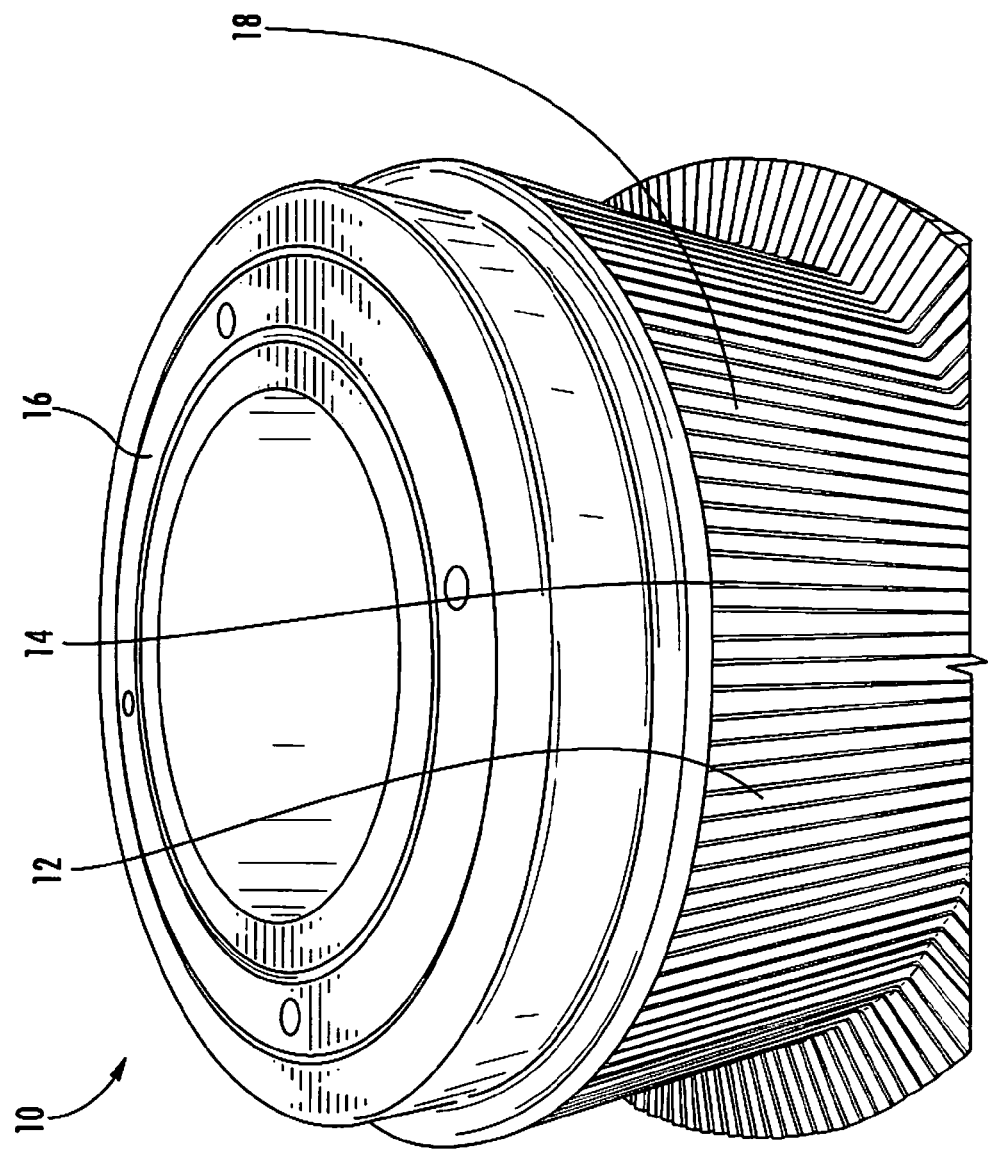
FIG. 1 illustrates a top perspective view of an electric motor commutator made from wedge shaped copper bars separated by thin sheets of mica and mounted to a metal hub.

With reference to FIG. 1, an electric motor commutator 10 is illustrated. The commutator 10 is a device having a circular arrangement of wedge-shaped copper bars 12 interspersed with thin sheets 14 of an insulating substance, such as mica. The commutator bars 12 may be circularly arranged around and mounted to a metal hub 16. The arrangement of the bars 12 around the metal hub 16 provides a commutator surface 18 suitable for inspection.

Figure 2:
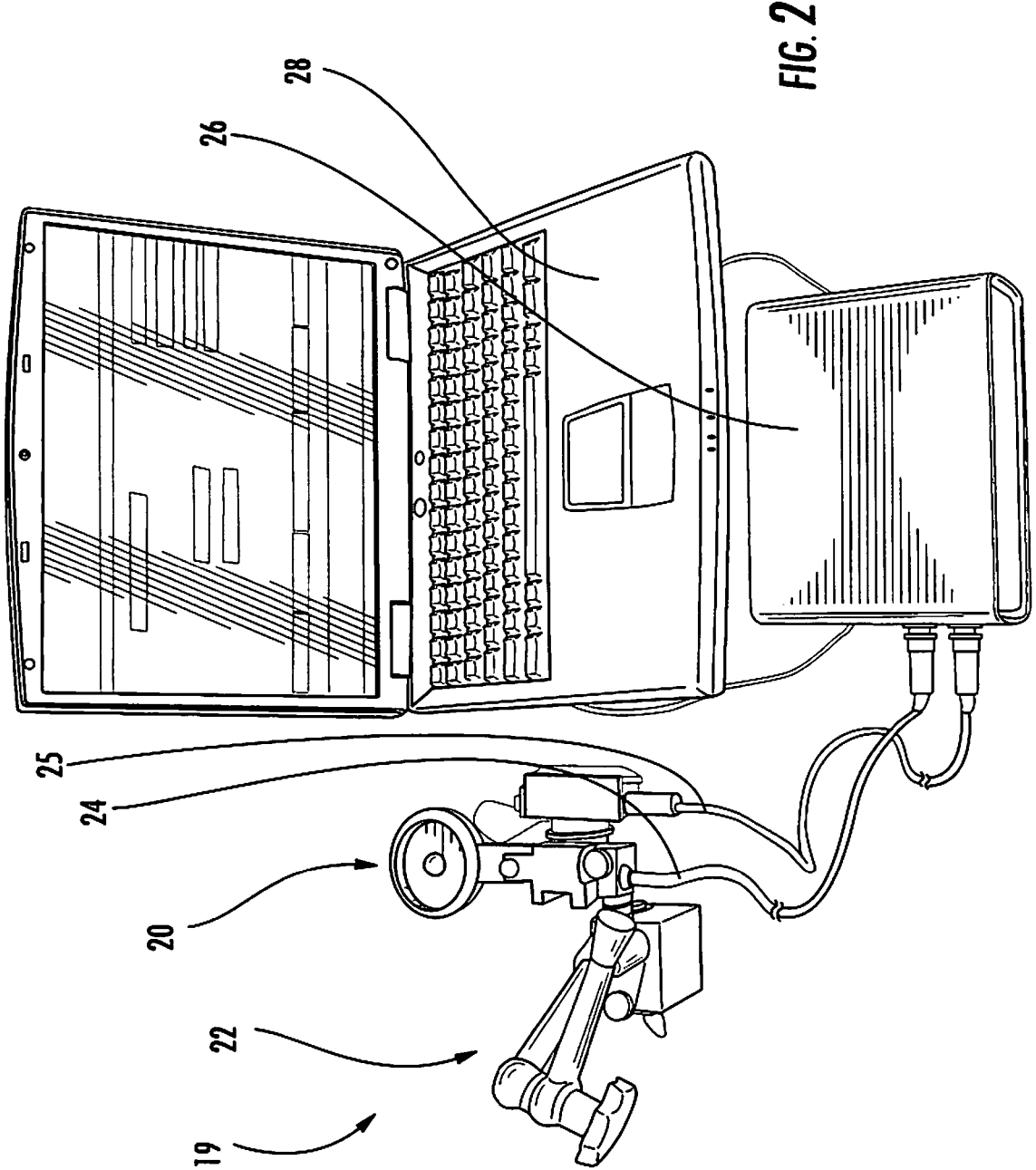
FIG. 2 illustrates an exemplary embodiment of parts of a measurement apparatus.

With reference to FIG. 2, an exemplary embodiment of an apparatus 19 for measurement and analysis of a commutator surface 18 is illustrated. The apparatus 19 includes an inspection head 20 mechanically connected to positioning hardware 22. The inspection head 20 is electronically connected via data transmission cables 24 and 25 to a processing system, including a microprocessor 26 which may be interfaced with a computer 28. In alternative embodiments of the present disclosure, the data transmission cables 24 and 25 may be combined into a single data transmission cable that transmits data from the inspection head 20.

Figure 3:
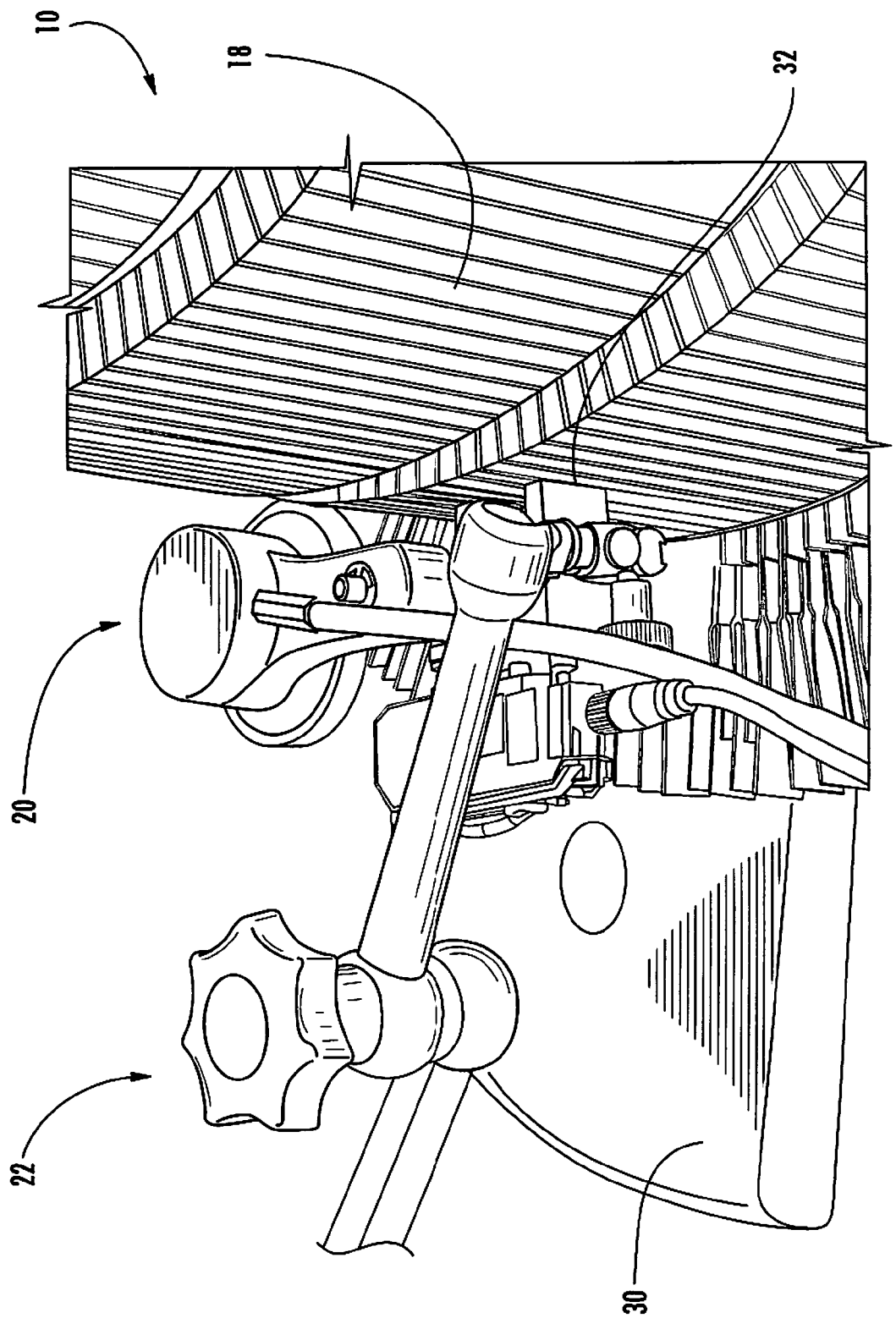
FIG. 3 illustrates a close-up view of an exemplary embodiment of the measurement apparatus mounted adjacent to a commutator surface.

FIG. 3 illustrates a commutator 10 mounted upon a rotational platform 30, such as a vertical lathe. The inspection head 20 may be positioned adjacent to the commutator surface via the positioning hardware 22, such that a gap 32 may exist between the inspection head 20 and the commutator surface 18.

Figure 4:
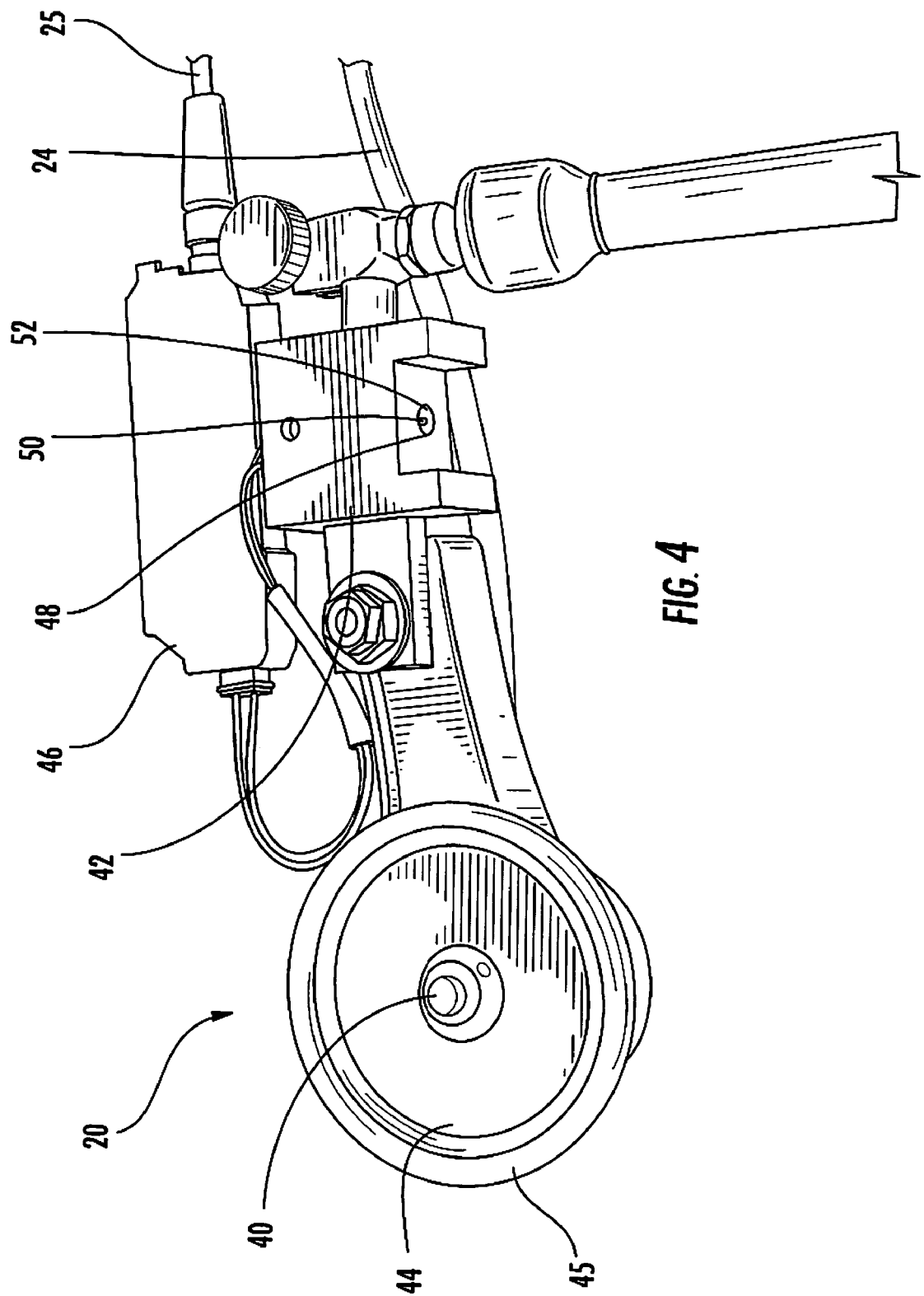
FIG. 4 illustrates a close-up view of an exemplary embodiment of the inspection head.

FIG. 4 illustrates in further detail an exemplary embodiment of the inspection head 20. A rotary encoder unit 40 is pivotally mounted adjacent to a spacer block 42. The spacer block 42 may be metal, plastic, or other suitable material. The pivot mount may be spring loaded so as to keep a measuring wheel 44 rotatably attached to the rotary encoder 40 in constant contact with the commutator surface 18 when the inspection head 20 is held in a position relative to the commutator surface 18 suitable for conducting a test. The measuring wheel 44 may be circumscribed by an elastomeric material 45 so that it turns without slippage as the commutator 10 is rotated. As the measuring wheel 44 is turned, the rotary encoder 40 transmits a predefined number of pulses per revolution to the microprocessor 26 via the rotary data transmission cable 24. In one embodiment of the present disclosure, the rotary encoder unit 40 employed may be an Encoder Products Model TR-1 rotary encoder. It should be noted however, that other rotary encoder modules may be suitable for the purposes described herein.

Adjacent to the rotary encoder unit 40, a signal amplifier 46 may be fixedly attached adjacent to the spacer block 42. The fiber optic sensor 48 may comprise an emitter 50 and a receiver 52, and may be housed within the spacer block 42 and electrically connected to the signal amplifier 46. The fiber optic sensor 48 may be held at an optimum distance from the commutator surface 18 by positioning the spacer block 42 at a predetermined distance away from the commutator surface 18. The fiber optic sensor 48 may be calibrated so that it produces a high output when the light beam is over a copper bar 12 and a zero (low) output when over an insulating sheet 14. Thus, the transition from a low output signal to a high output signal may indicate the leading edge of a copper bar 12. Conversely, the transition from a high output signal to a low output signal may indicate the trailing edge of a copper bar 12. One embodiment of the present disclosure may incorporate a Keyence Model FU-35-FZ Sensor coupled to a Keyence Model FS-V33 signal amplifier, but other makes or models and combinations of sensors and signal amplifiers may be suitable for the presently disclosed purpose as well.

Referring back to FIG. 2, the signals from the rotary encoder unit 40 and the signal amplifier 46 (both being part of the inspection head 20) are transmitted via the data transmission cables 24 and 25 to the microprocessor 26. One embodiment of the microprocessor 26 may be a Z-World Model RCM3750. In one embodiment, a desktop or portable computer 28 may be interfaced with the microprocessor 26 for further analysis and viewing of the data. In a further embodiment of the present disclosure, the processing system may comprise a single unit having both a microprocessor and hardware and software for a user interface, thus eliminating the need for a separate computer.

The rotary data signal and the fiber optic sensor signal are correlated by the microprocessor 26 so that a unique pulse count corresponds to every output transition event from the signal amplifier 46. A program in the microprocessor 26 converts the correlated data pairs into arc lengths pertaining to the commutator surface 18. In one embodiment, the output of the microprocessor is a segment number, paired with a digital number representing a segment length. So, an example of a data pair transmitted by the microprocessor could be 7, 0.100. Such data would indicate that the arc length of segment 7 is 100 thousandths of an inch.

In one embodiment of the present disclosure, the commutator 10 may be rotated beneath the inspection head 20 for one full revolution plus the number of segments in the span. The calculated arc lengths may be processed by the computer software program. Information for each individual segment, as well as the commutator's variation from the theoretical span, may be analyzed and graphed. Using such a system, the radial spacing of commutator segments may be measured to an accuracy of about ±0.0008" inch of arc length along the circumference of the commutator surface.

Figure 5:
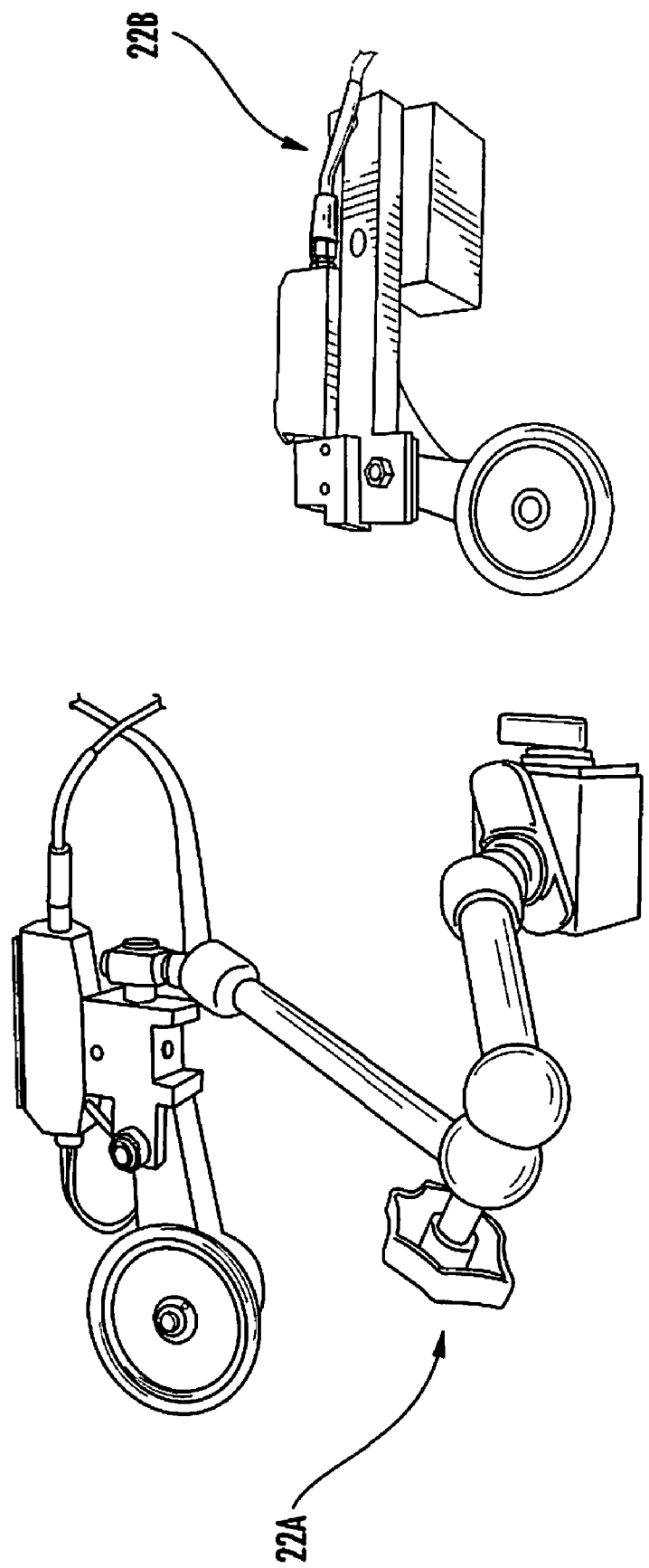
FIG. 5 illustrates an exemplary embodiment of two types of positioning hardware.

FIG. 5 illustrates in further detail two examples of embodiments of the positioning hardware 22. The function of the positioning hardware is to hold the inspection head 20 adjacent to the commutator surface 18 (as seen in FIG. 3). It is important that the inspection head 20 remain steady at a predetermined orientation relative to the commutator surface 18 during the test. The adjustable hardware 22A may be mounted to a stationary surface and the inspection head 20 may then be manually positioned adjacent to the commutator surface 18 and locked into place. The fixed hardware 22B may be solidly mounted to a movable part of the machinery upon which the commutator 10 is being tested (such as the tool post on a lathe). The machinery would then be used to move the inspection head 20 into position. The test procedure remains substantially the same for both types of positioning hardware 22. Selection of the type of positioning hardware 22 may be based upon the configuration of the machinery upon which the commutator 10 is being tested.

Figure 6:
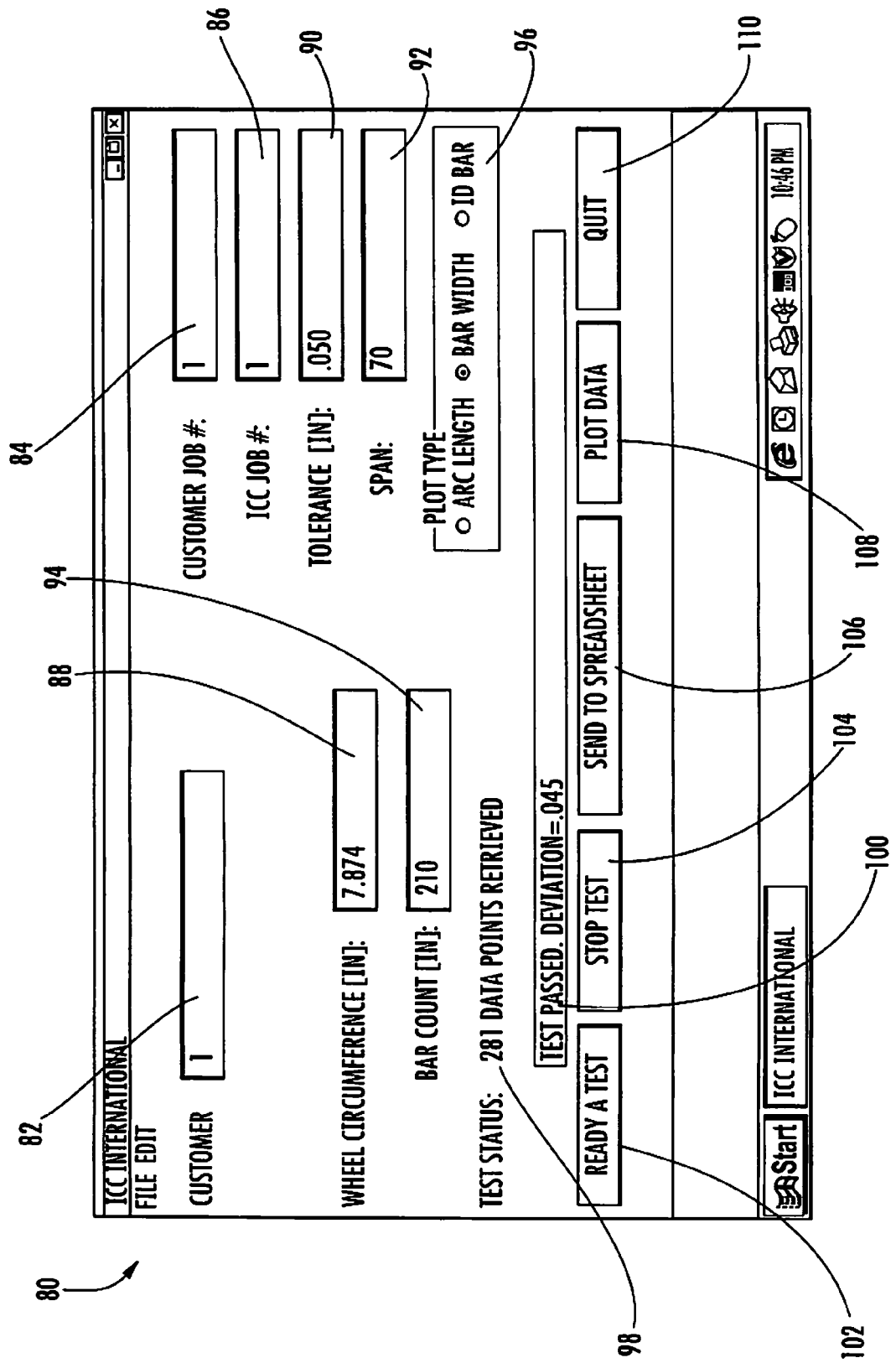
FIG. 6 illustrates an exemplary embodiment of a computer software user interface for inputting test parameters and viewing test results.

FIG. 6 illustrates an example embodiment of a computer software user interface 80, programmed into the computer 28, suitable for data entry and recording of the correlated data sent from the microprocessor 26. The user begins by turning on the computer 28 and opening the interface program. Information about the customer and job are input by the user into a "Customer" input box 82, a "Customer Job #" input box 84, and an "ICC Job #" input box 86. Information about the rotary encoder of the inspection head is input by the user into a "Wheel Circumference (In.)" input box 88. Parameters regarding the commutator being measured are input by the user into a "Tolerance" input box 90, a "Span" input box 92, and a "Bar Count" input box 94. In an alternative embodiment, there may also be a "Repeatability Error" display field.

The user may perform the test after the above mentioned information and parameters have been input. The user may initiate the test and the recording of data by pressing a "Ready A Test" button 102. After initiating the test, the user may rotate the commutator beneath the inspection head as described above. The "Test Status" display field 98 may provide a real-time update on how many segments have passed beneath the fiber optic sensor 48. If required, the current test may be aborted by pressing the "Stop Test" button 104. The program may automatically complete the test once it has received the required amount of data points. Upon completion of the test, the test summary display field 100 may show the pass/fail status along with the commutator's total amount of variation from the theoretical span. Additionally, the program may display a "Repeatability Error" calculated from the section of commutator that is measured twice by the inspection head during the test, in order to ensure that the encoder wheel is measuring distance accurately over the course of the one or more tests.

The user may then select to view a graph of the data by pressing the "Plot Data" button 108. The type of data plot output by the program is determined by the "Plot Type" selection box 96. The user may also wish to send the data to a spreadsheet by pressing the "Send To Spreadsheet" button 106 causing the recorded data to be output in a spreadsheet format. To exit the program, the user may press the "Quit" button 110.

Figure 7:
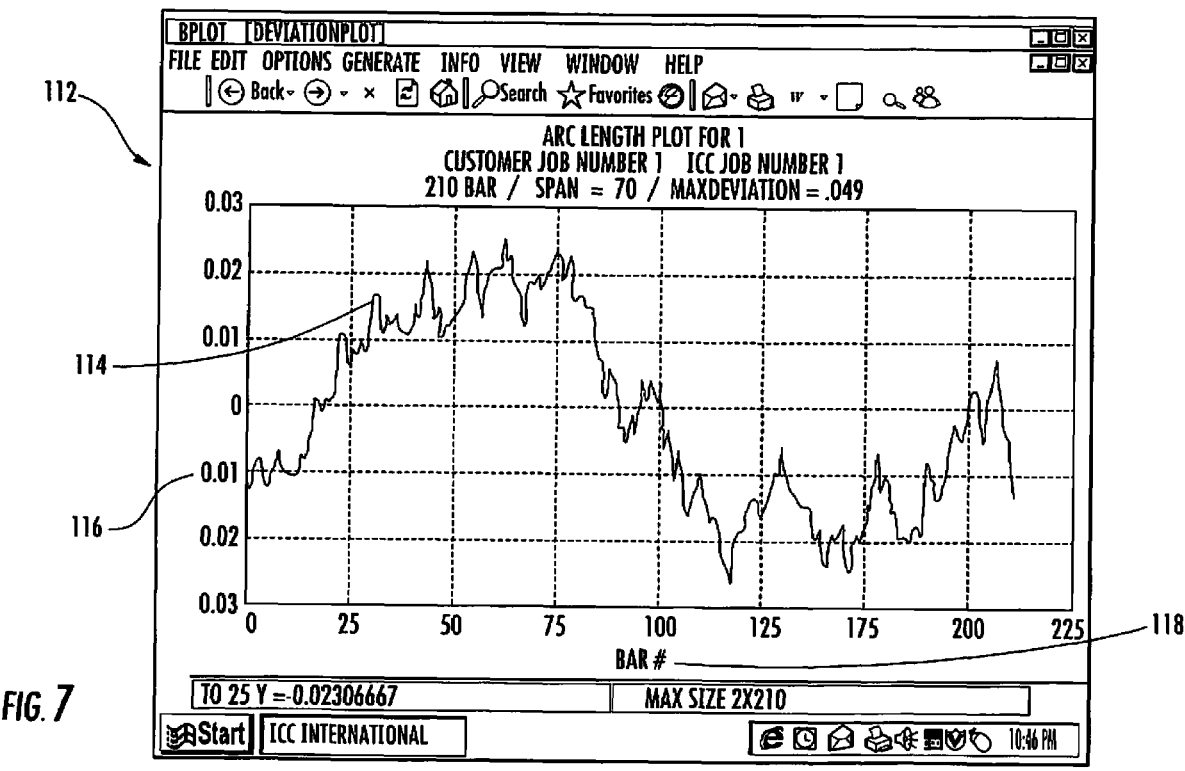
FIG. 7 provides an example of an Arc Length Plot output from the computer software.

FIG. 7 provides an example embodiment of an Arc Length Plot 112 produced as graphical output by the computer software. The plot may be represented by a curve 114 plotting deviation 116 against the bar number 118. The curve represents how the actual radial spacing of the commutator segments deviates from the calculated theoretical span.

Figure 8:
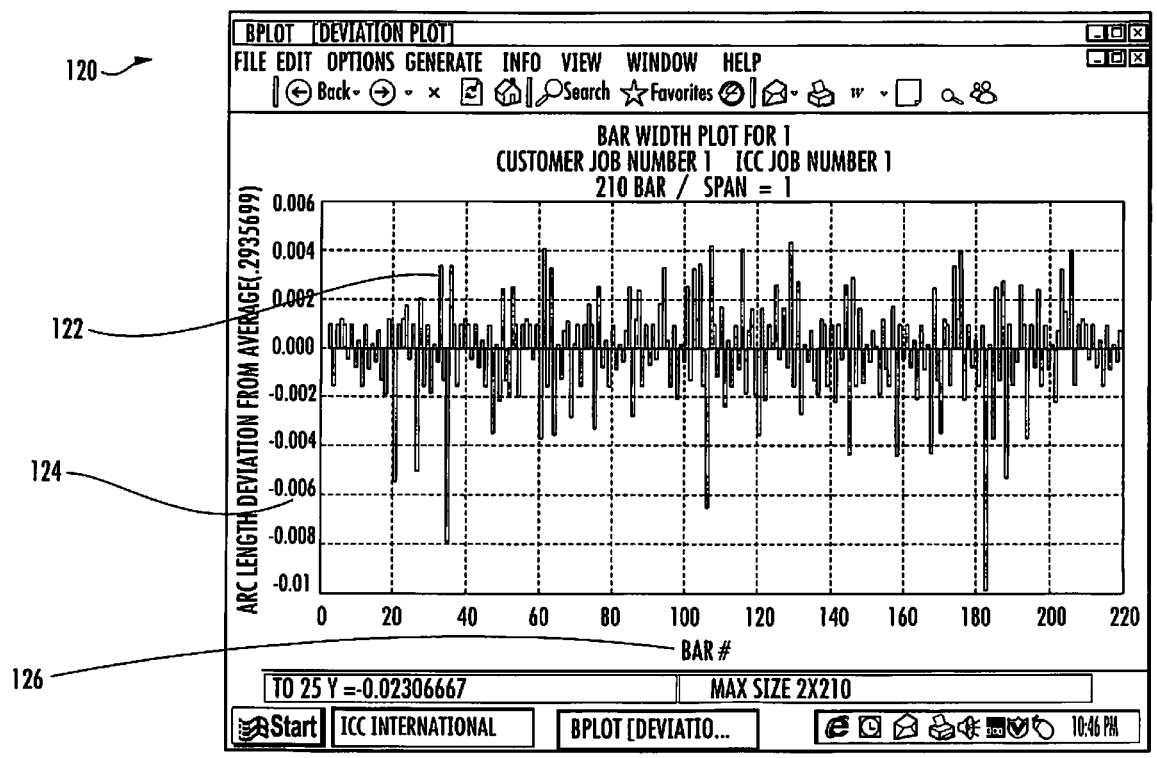
FIG. 8 provides an example of a Bar Width Plot output from the computer software.

FIG. 8 provides an example embodiment of a Bar Width Plot 120 produced as graphical output by the computer software. The plot is represented by graph bars 122 that correspond to the magnitude of deviation 124 per bar number 126. The data represents how each commutator segment deviates from the calculated average segment width.

Figure 9:
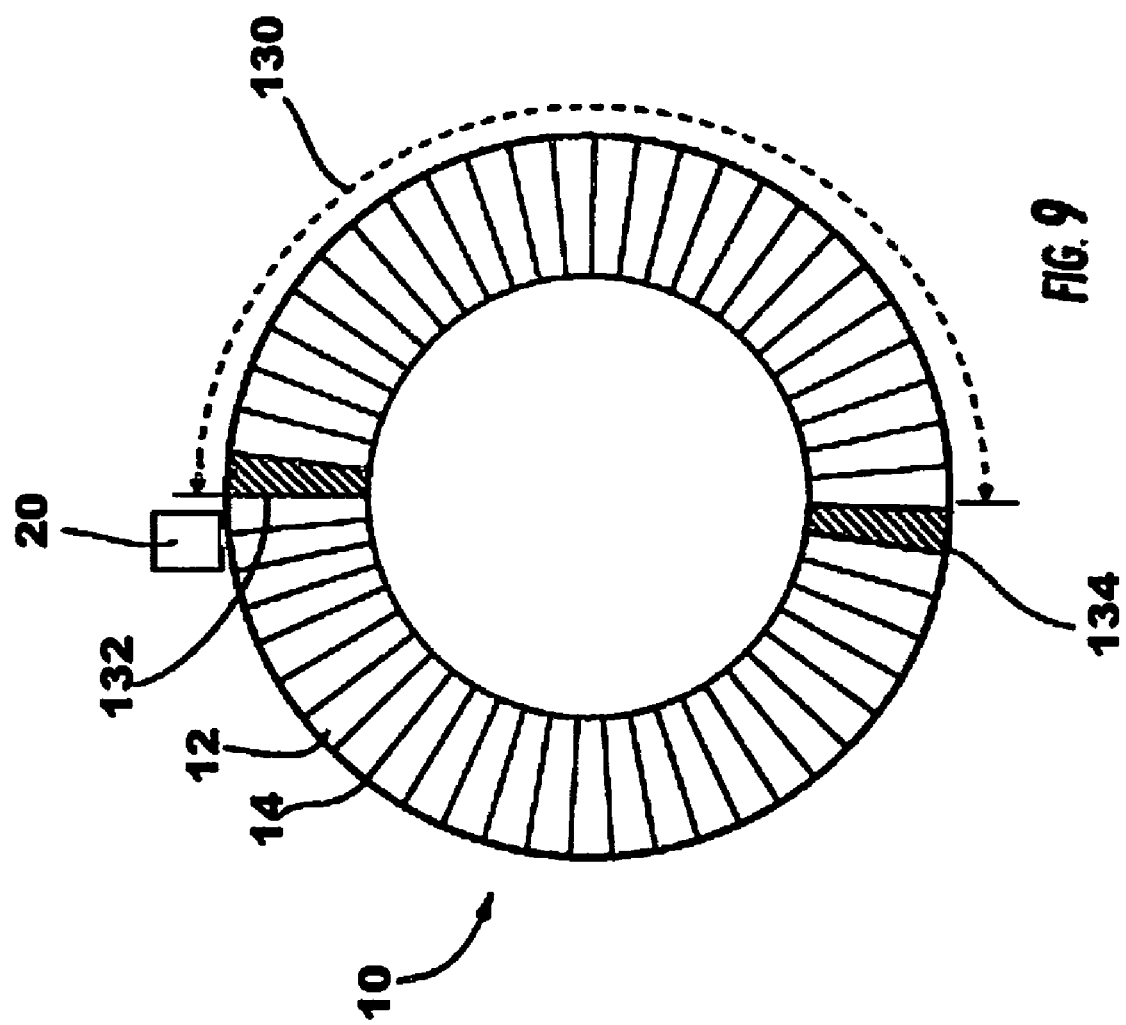
FIG. 9 is a diagrammatic illustration of an exemplary span around a commutator.

With reference to FIG. 9, a diagrammatic illustration of an example span 130 around a cross-sectional representation of a commutator 10 is presented. The illustration is not intended to be limiting in any way, but merely exemplifies the concept of span 130 and how the span 130 of a commutator 10 may be measured. The commutator 10 in this example has sixty bars 12 and sixty insulating sheets 14. It is assumed for the purpose of this example that the illustrated commutator 10 is used in an electric motor having four poles (not shown), however the principles of span 130 measurement remain the same regardless of commutator size or the number of poles in the motor. As defined previously, the theoretical span 130 for this commutator 10 would be thirty segments.

In this particular non-limiting example, the commutator 10 is being rotated in a counterclockwise direction to allow each bar 12 and adjacent sheet 14 to pass beneath the inspection head 20. The distance from the leading edge of a first bar 132 to the leading edge of a thirty-first bar 134 (counted consecutively) on the commutator 10 defines a span 130, regardless of the position of the first bar 12. In other words, the distance between the leading edges of any thirty bar grouping on the example commutator 10 would represent a span 130. Thus, the term "first bar" refers to any bar 12 at which the counting of bars for the determination of span 130 is initiated.

The foregoing embodiments are susceptible to considerable variation in their practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

The invention claimed is:

1. An apparatus for measurement of a commutator surface having bars and insulating layers comprising:
   an inspection head comprising:
      a distance measuring unit for moving along the commutator surface across the bars and insulating layers and for producing a distance signal corresponding to the distance that the distance measuring unit moves relative to the commutator;
      a sensor unit held by the mount adjacent to the commutator surface for producing a sensor signal corresponding to the position on the commutator surface with the sensor signal indicating when the sensor unit is over a bar and when the sensor unit is over an insulating layer; and
      a processing system for receiving and analyzing signals corresponding to the distance signal and the sensor signal, and for determining distances on the commutator from which spans of the commutator may be calculated, and for calculating spans of the commutator; and
   a mount for holding and positioning the inspection head adjacent the commutator surface.

2. The apparatus of claim 1, wherein the distance measuring unit further comprises:
   an encoder wheel;
   an elastomeric material circumscribed around the circumference of the wheel; and
   a pulse encoder rotatably affixed to the encoder wheel for producing a signal corresponding to the rotation of the encoder wheel.

3. The apparatus of claim 1, wherein the sensor unit further comprises:
   a fiber optic sensor unit having an emitter for transmitting light and a receiver for sensing light intensity and producing a sensor signal corresponding to a position on the commutator surface with the sensor signal indicating when the sensor unit is over a bar and when the sensor unit is over an insulating layer;
   a signal amplifier for receiving and amplifying the sensor signal;
   a spacer block housing the sensor unit, the emitter and the receiver, such that the emitter and the receiver are maintained in a substantially perpendicular orientation to and spaced apart from the commutator surface; and
   a sensor data transmission cable affixed to the signal amplifier.

4. The apparatus of claim 1, wherein the distance measuring unit comprises a rotary encoder and the sensor comprises a fiber optic sensor, both the rotary encoder and the fiber optic sensor being mounted to opposite ends of the inspection head, the positioning hardware functioning to maintain the position and orientation of both the rotary encoder and the fiber optic sensor at the commutator surface, such that the rotary encoder unit is in contact with the commutator surface, and such that the fiber optic sensor unit is positioned a constant distance from the commutator surface.

5. The apparatus of claim 1, wherein said processing system further comprises a user input connected to the data processor and configured to receive a bar count corresponding to a span and the total bar count of the commutator, the data processor being programmed to calculate the length of multiple spans based on the bar count of a span and being operable to determine the end of a test based on the total bar count.

6. The apparatus of claim 1, wherein said processing system is programmed to calculate the length of multiple spans and calculate a deviation of each span from a design span length and further comprises an output for outputting information corresponding to the deviations.

7. The apparatus of claim 1, wherein said processing system comprises a microprocessor unit electrically interfaced with a computer.

8. A method for the measurement of variation in span around a commutator surface comprising:
   providing an electric motor commutator having a plurality of segments;
   providing an inspection head adjacent to the surface of the commutator;
   creating relative motion between the inspection head and the commutator such that the commutator is rotated beneath the inspection head so that each commutator segment passes the inspection head;
   producing signals with the inspection head that include information as to the position of the inspection head relative to the segments and as to the distance traveled by the inspection head along the circumference of the commutator,
   transmitting data corresponding to the signals from the inspection head to a processing system; and
   in the processing system calculating information from the data reflecting characteristics of the commutator segments, and calculating a span of the commutator.

9. The method of claim 8, further comprising mounting the commutator on a rotary mount and providing the relative motion by rotating the commutator and holding the inspection head stationary.

10. The method of claim 8, wherein the step of creating relative motion comprises moving the commutator relative to the inspection head for one full revolution plus one span.

11. The method of claim 8, wherein the step of creating relative motion comprises moving the commutator relative to the inspection head for one full revolution plus one span, and wherein the calculating step further comprises calculating information regarding a last group of spans based on measurement taken after one full revolution and during the "plus one span" motion.

12. The method of claim 8, further comprising inputting information into the processing system regarding the construction of the commutator and the span of the commutator.

13. The method of claim 8, further comprising inputting information into the processing system regarding the total number of bars in the commutator and the number of bars in a span of the commutator.

14. The method of claim 8, further comprising inputting information into the processing system regarding the total number of bars in the commutator and the number of bars in a span of the commutator, and wherein the calculating step comprises calculating the number of bars in one revolution plus one span based on the information input into the computer.

15. The method of claim 14, further comprising determining the end of a test based on the count of bars and the calculated number of bars in one revolution plus one span.

16. The method of claim 8, wherein the processing system comprises a microprocessor unit electrically interfaced with a computer.

17. The method of claim 8, wherein the step of providing an inspection head further comprises:
   providing a rotary encoder unit having a rotary data transmission cable and having an encoder rotatably affixed to an encoder wheel circumscribed by an elastomeric material;
   providing a fiber optic sensor unit having an emitter, a receiver, a signal amplifier, and a sensor data transmission cable; and
   providing a spacer block for housing the emitter and the receiver, such that the emitter and the receiver are maintained at a constant distance from and in a substantially perpendicular orientation to the commutator surface.

* * * * *